(12) United States Patent
Kang (10) Patent No.: US 8,588,122 B2
(45) Date of Patent: Nov. 19, 2013

(54) METHOD OF TRANSMITTING DATA TO MULTI DESTINATIONS IN WIRELESS LAN SYSTEM

(75) Inventor: Joo Rak Kang, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 708 days.

(21) Appl. No.: 12/255,190

(22) Filed: Oct. 21, 2008

(65) Prior Publication Data

US 2009/0147719 A1 Jun. 11, 2009

(30) Foreign Application Priority Data

Dec. 7, 2007 (KR) .................. 10-2007-0126827

(51) Int. Cl.
*H04H 20/71* (2008.01)
*H04B 7/212* (2006.01)

(52) U.S. Cl.
USPC .................................. 370/312; 370/347

(58) Field of Classification Search
USPC ............................................. 370/448, 504
See application file for complete search history.

(56) References Cited

U.S. PATENT DOCUMENTS

| 7,631,240 | B2* | 12/2009 | Frederiks et al. | 714/748 |
| 7,664,031 | B2* | 2/2010 | Davis | 370/235 |
| 2006/0029099 | A1 | 2/2006 | Jang et al. | |
| 2006/0034174 | A1* | 2/2006 | Nishibayashi et al. | 370/235 |
| 2007/0091862 | A1* | 4/2007 | Ioannidis | 370/338 |
| 2007/0153757 | A1 | 7/2007 | Kim et al. | |
| 2010/0091759 | A1* | 4/2010 | Stahl et al. | 370/347 |

FOREIGN PATENT DOCUMENTS

KR 2006-0013607 A 2/2006

\* cited by examiner

*Primary Examiner* — Afshawn Towfighi
(74) *Attorney, Agent, or Firm* — Lowe Hauptman & Ham, LLP (57) ABSTRACT

There is provided a method of transmitting data to multi destinations in a wireless LAN system. In the method, a transmitting device generates a media access control protocol data unit (MPDU) for each of a plurality of destination devices, and the transmitting device generates an aggregated-MPDU (A-MPDU) by sequentially adding the MPDU for each of the destination devices. A physical header is added to the A-MPDU, and then the A-MPDU with the physical head added is transmitted to the plurality of destination devices at the transmitting device. The respective destination device transmits ACK frames, which notify a successful reception, to the transmitting device after receiving a self-destined MPDU from the A-MPDU and verifying the received MPDU. The transmitting device receives the ACK frames transmitted from the respective destination devices in sequence.

8 Claims, 5 Drawing Sheets

METHOD OF TRANSMITTING DATA TO MULTI DESTINATIONS IN WIRELESS LAN SYSTEM

CROSS-REFERENCE TO RELATED APPLICATIONS

This application claims the priority of Korean Patent Application No. 2007-126827 filed on Dec. 7, 2007 in the Korean Intellectual Property Office, the disclosure of which is incorporated herein by reference.

BACKGROUND OF THE INVENTION

1. Field of the Invention

The present invention relates to a method of transmitting data to multi destinations in a wireless local area network (WLAN) system, and more particularly, to a method of transmitting data to multi destinations in a WLAN system, which can minimize an access time to a media in a contention-based media access control network by transmitting an aggregated-media access control protocol data unit (A-MPDU) having a plurality of MPDUs addressed to different destinations and sequentially receiving response frames (ACK frames) according to a given order.

2. Description of the Related Art

Recently, IEEE 802.11n standard is close to being finalized, which is expected to provide a high data transmission rate beyond 100 Mbps in a user area. Accordingly, a home network system, which can transmit a high definition (HD) moving picture (HD stream) with high capacity using a high bandwidth, is being actively researched and commercialized.

Figure 1:
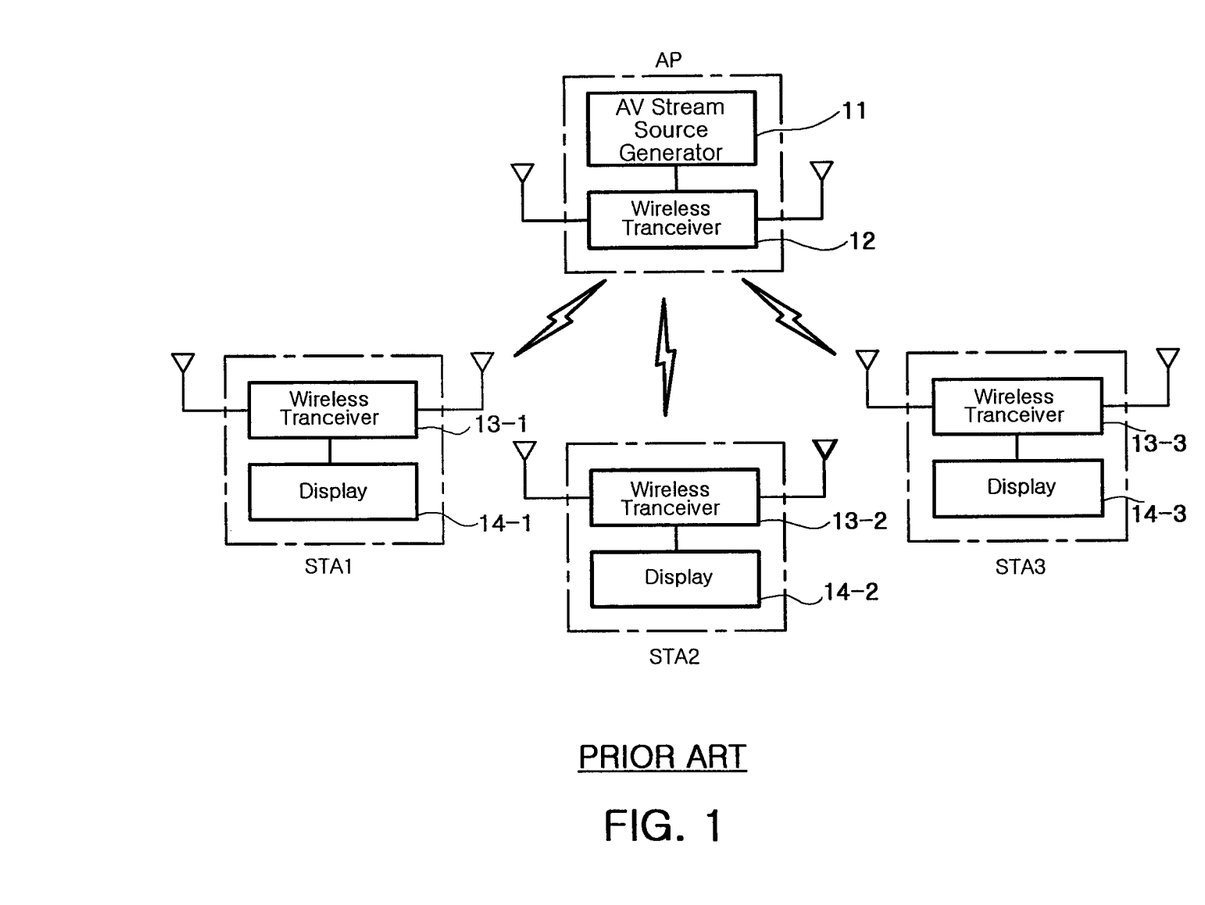
FIG. 1 illustrates a wireless AV system using a wireless local area network (WLAN) system.

FIG. 1 illustrates a general home network using a wireless AV system. Referring to FIG. 1, an access point AP of a wireless local area network (WLAN) system includes an AV stream source generator 11 generating AV stream data, a wireless transceiver 12 transmitting the generated AV stream data wirelessly. Stations STA1, STA2 and STA3 of the WLAN system respectively include wireless transceivers 13-1, 13-2 and 13-3 receiving data transmitted from the wireless transceiver 12 of the access point AP, and displays 14-1, 14-2 and 14-3 displaying the received data.

Typically, in case of data composed of image data such as HD moving picture, a user can promptly recognize a display state when data is partially lost. Also, when an image data reaches at a time later than a given time, an image is abnormally displayed. Therefore, to satisfy service quality for a user, it is very important to minimize a delay time of data transmitted from the access point AP to each of the stations STA1 to STA3. In particular, there is an increasing demand for a method of transmitting data, which can reduce a delay of each station in a WLAN system where one access point AP is connected to multi stations STA1 to STA3.

In general, IEEE 802.11 WLAN technology employs a distributed coordination function (DCF) based on carrier sense multiple access with collision avoidance (CSMA/CA) so as to allow multi users to access to a wireless channel. According to a backoff scheme of the DCF, a wireless device transmits data if a channel is not used, after detecting for a random time whether the channel is used prior to the transmission of the data. This allows several wireless devices to share the same wireless channel. Further, the IEEE 802.11 WLAN technology uses a response frame of an ACK frame so as to provide the accuracy of data transmission due to characteristics of a wireless channel. When data addressed to a specific destination is transmitted, and a wireless device having a corresponding destination address receives the data accurately, an ACK frame is transmitted to the wireless device transmitting the data. If, however, the wireless device transmitting the data does not receive the ACK frame in response to the transmitted data, the wireless device judges that the transmitted data is lost or damaged due to channel conditions, and re-transmits the data. Hence, the WLAN system provides the accuracy of data transmission through the above-described procedure.

Figure 2:
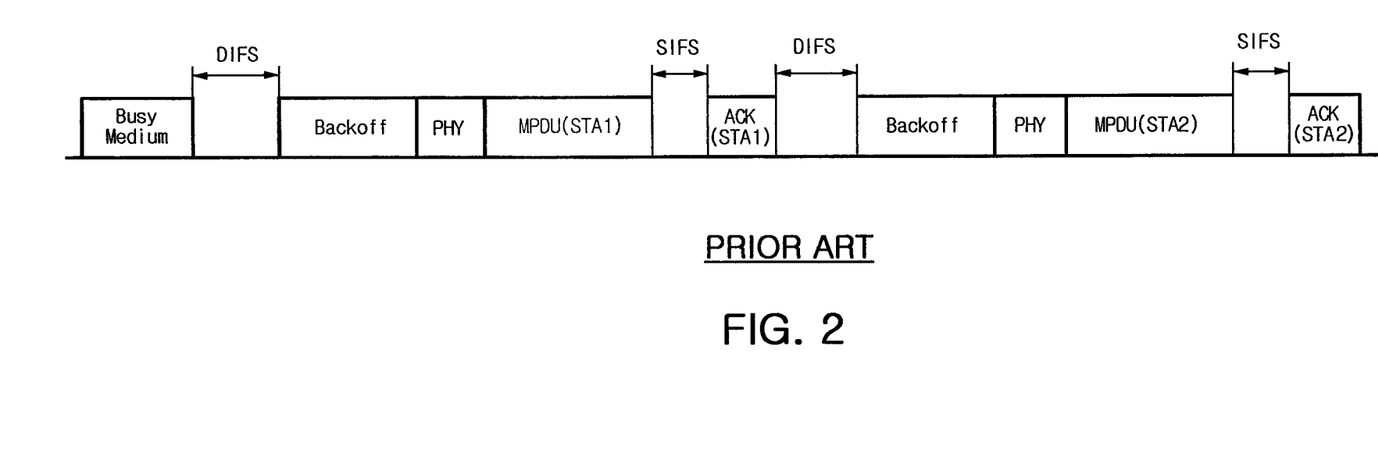
FIG. 2 illustrates a related art method of transmitting data to multi destinations in a WLAN system.

FIG. 2 illustrates a related art method of transmitting data from the access point AP to two stations STA1 and STA2 according to the IEEE 802.11 WLAN technology. According to the IEEE 802.11 WLAN technology, a media access control (MAC) layer of the access point AP of the WLAN system generates data to be transmitted to each station as a media access control protocol data unit (MPDU). Further, the MAC layer of the access point AP adds a physical header (PHY) to an MPDU to be transmitted to each station. Thereafter, the access point AP transmits the MPDU, which is addressed to the first station STA1 and the physical header (PHY) is added to, over a wireless channel, after the total lapse of a using time of the wireless channel (Busy Medium), a DCF interframe space (DIFS) and a backoff time (Backoff). The access point AP receives the ACK frame from the first station STA1 after the lapse of a predetermined short interframe space (SIFS) from a timing when the transmission of the MPDU to the first station STA1 is completed. Subsequently, the access point AP transmits an MPDU, which is addressed to the second station STA2 and a physical header (PHY) is added to, over the wireless channel, after the total lapse of a DIFS and a backoff time. After the lapse of an SIFS, the access point AP receives an ACK frame.

According to the related art method of transmitting data to multi destinations, as described above, the DIFS, backoff, SIFS, and ACK frame reception time should be required whenever the MPDUs are respectively transmitted to the stations. This causes the transmission of an MPDU to a next destination station to be delayed. Particularly, if the access point does not receive the ACK frame when an MPDU is transmitted to a preceding destination station, the access point should re-transmit the MPDU to that preceding destination station. Consequently, the transmission of an MPDU to a next destination station is further delayed.

To solve the transmission delay, a method of broadcasting data to be transmitted from the access point to the station may be used because it can simultaneously transmit data to all the stations through one-time data transmission so that it is possible to minimize a delay time caused by a transmission order of MPDUs for each station. However, this method is disadvantageous in that it is impossible to increase the accuracy of data transmission through re-transmission because there is no method of detecting the loss of broadcasted data occurring during transmission. Moreover, the broadcasting method is available only when all the stations request the same data.

Therefore, it is essentially required to develop a new transmission method, which can increase the accuracy of data transmission through re-transmission while transmitting data to multi destinations in a WLAN system.

SUMMARY OF THE INVENTION

An aspect of the present invention provides a method of transmitting data to multi destinations in a WLAN system, which can minimize an access time to a media in a contention-based media access control network by transmitting an aggregated-media access control protocol data unit (A-MPDU) having a plurality of MPDUs addressed to different destinations and sequentially receiving response frames (ACK frames) according to a given order.

According to an aspect of the present invention, there is provided a method of transmitting data to multi destinations in a wireless local area network (WLAN) system, the method including: generating, by a transmitting device, a media access control protocol data unit (MPDU) for each of a plurality of destination devices; generating, by the transmitting device, an aggregated-MPDU (A-MPDU) by sequentially adding the MPDU for each of the destination devices; and adding a physical header to the A-MPDU, and transmitting the A-MPDU with the physical head added, to the plurality of destination devices, by the transmitting device.

The method of transmitting data to multi destinations may further include: transmitting, by the respective destination device, ACK frames, which notify a successful reception, to the transmitting device after receiving a self-destined MPDU from the A-MPDU and verifying the received MPDU; and receiving, by the transmitting device, the ACK frames transmitted from the respective destination devices in sequence.

The method of transmitting data to multi destinations may further include adding a physical header to an MPDU for the specific destination device from which the transmitting device does not receive the ACK frame, and transmitting the MPDU with the physical header added, to the specific destination device, after the lapse of a short interframe space (SIFS) from a timing when a sequential transmission of the ACK frames is terminated, when the transmitting device does not receive the ACK frame from a specific destination device.

The generating of the A-MPDU may include sequentially adding the MPDUs for the respective destination devices by inserting identifiers between the MPDUs.

The generating of the A-MPDU may include adding an ACK request frame to the A-MPDU, the ACK request frame indicating that the transmission of the A-MPDU is terminated and the ACK frames starts to be sequentially transmitted.

The transmitting of the ACK frame to the transmitting device may include: detecting, by the respective destination devices, a position and an order of a self-destined MPDU from the A-MPDU; and transmitting, by the respective destination devices, the ACK frames to the transmitting device according to the detected order.

The ACK request frame may use a block ACK request (BAR) defined in WLAN standard, and the ACK request frame may inform the plurality of destination devices that the ACK frames are sequentially transmitted, through a set-up for one bit of a reserved region in a BAR control field of a BAR frame.

The transmitting of the ACK frames to the transmitting device according to the detected order may include: transmitting, by a first destination device according to the detected order, the ACK frame to the transmitting device after the lapse of an SIFS from a timing when the transmission of the A-MPDU is terminated; and transmitting, by another destination device according to the detected order, the ACK frame to the transmitting device after the lapse of a reduce interframe space (RIFS) from a timing when the transmission of the ACK frame by a preceding destination device is terminated.

The transmitting of the ACK frames to the transmitting device according to the detected order may include transmitting the ACK frame to the transmitting device at a timing when a time determined by Equation (1) elapses after the transmission of A-MPDU is terminated, $$T = SIFS + (ACK\_Tx\_Time + RIFS) \times (Order - 1) \quad (1)$$

where ACK_Tx_time is a length of the ACK frame, and Order is the detected order.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. It is noted that shapes and sizes of elements in the drawings may be exaggerated for clarity.

Figure 3:
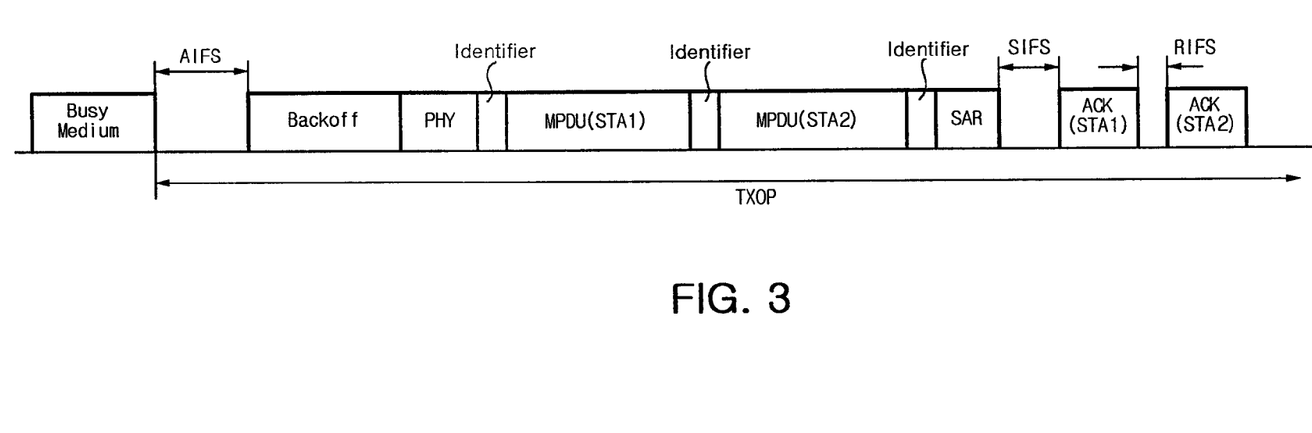
FIG. 3 illustrates a method of transmitting data to multi destinations in a WLAN system according to an embodiment of the present invention.

FIG. 3 illustrates a method of transmitting data to multi destinations in a WLAN system according to an embodiment of the present invention. In particular, FIG. 3 exemplarily illustrates that a transmitting device of the WLAN system transmits data to two different receiving devices.

First, the transmitting device of the WLAN system generates a media access control protocol data units (MPDU) for each of a plurality of destination devices. For example, the transmitting device of the WLAN system may be an access point (AP), and the plurality of destination devices may be a plurality of stations (STA). The generating of the MPDU may be carried out at a media access control (MAC) layer of the transmitting device (i.e., access point). For example, in a home network system using a WLAN as illustrated in FIG. 1, the MAC layer of the transmitting device generates an MPDU (STA1) and an MPDU(STA2) to be transmitted to the respective receiving devices (for example, a first station (STA1) and a second station (STA2)) using an AV stream (e.g., high definition (HD) stream) generated from an AV stream source generator (see 11 of FIG. 1). Each of the MPDUs may contain destination information such as an address of the destination device. Therefore, the receiving device can identify the MPDU to be received using the destination information.

Thereafter, the transmitting device generates an aggregated-MPDU (A-MPDU) by sequentially adding the generated MPDU(STA1) and MPDU(STA2) for the respective destinations. The A-MPDU generated according to the present invention is similar to an A-MPDU defined in IEEE 802.11n standard. That is, in the A-MPDU generated according to the present invention, an identifier is inserted between the MPDUs, and thus the MPDUs having different destinations may be distinguished from each other. The identifier may be inserted between the A-MPDU and a physical header to be described later. Also, the identifier may be inserted between the A-MPDU and a scheduled ACK request (SAR) frame to be described later. The generating of the A-MPDU may be carried out at the MAC layer of the transmitting device (i.e., access point) in the WLAN system.

The generating of the A-MPDU may include adding the scheduled ACK request (SAR) frame to the A-MPDU. Herein, the scheduled ACK request (SAR) frame is a frame indicating that the transmission of the A-MPDU is terminated and simultaneously an ACK frame starts to be transmitted to the receiving device. The scheduled ACK request (SAR) frame will be more fully described later.

Afterwards, the transmitting device adds the physical header (PHY) to the A-MPDU, and transmits the A-MPDU with the physical header (PHY) added, to the plurality of destination devices. The adding of the physical header (PHY) may be carried out at a physical layer of the transmitting device (i.e., access point) in the WLAN system. The physical header may include a physical layer convergence protocol (PLCD) header and a preamble. The transmitting device transmits data to the destination device by adding the physical header (PHY) to the A-MPDU and transmitting the A-MPDU with the physical header (PHY) added over a wireless channel.

After the transmitting device (i.e., access point) of the WLAN system transmits data as described above, the destination device receives the data, verifies whether the data is lost or damaged, and then transmits the ACK frame to the transmitting device.

More specifically, each of the destination devices can receive a self-destined MPDU from the A-MPDU transmitted from the transmitting device. Note that a "self-destined MPDU" as used herein refers to an MPDU received by a destination device that is addressed to that destination device. Each of the destination devices receives the A-MPDU transmitted from the transmitting device, and identifies the self-destined MPDU contained in the A-MPDU. Then, each of the destination devices may take its self-destined MPDU, and disuse the others.

Subsequently, each of the destination devices detects an error by verifying the received MPDU, and then transmits an ACK frame notifying successful reception to the transmitting device if there is no error. In the embodiment of the present invention, a receiving device of the WLAN system should receive the ACK frames from the plurality of destination devices. At this time, when the plurality of destination devices transmit the ACK frames at the same time, the ACK frames collide with each other so that the receiving device of the WLAN system may not receive the ACK frame. To prevent the collision, therefore, the plurality of devices transmit the ACK frames at different timings.

In detail, each of the destination devices detects a position and an order of the self-destined MPDU from the A-MPDU, and transmits the ACK frame to the transmitting device according to this detected order. For example, as illustrated in FIG. 3, assuming that the A-MPDU is achieved by sequentially adding the MPDUs for the destinations, e.g., two stations (STA1, STA2), the station (STA1) detects that the first MPDU is the self-destined MPDU, and the station (STA2) detects that the second MPDU is the self-destined MPDU. Thereafter, the station (STA1) transmits the ACK frame first, and then the station (STA2) transmits the ACK frame next. A timing when the receiving device transmits the ACK frame will be determined as followings.

As described above, each of the destination devices detects an order of the self-destined MPDU from the received A-MPDU. Subsequently, when a short interframe space (SIFS) elapses after the transmission of the A-MPDU is terminated, the first destination device according to the detected order transmits its own ACK frame to the transmitting device. Afterwards, when a reduce interframe space (RIFS) elapses after the first destination device completely transmits the ACK frame, the second destination device according to the detected order transmits its own ACK frame to the transmitting device. Likewise, when the RIFS elapses after the second destination device completely transmits the ACK frame, the third destination device according to the detected order transmits its own ACK frame to the transmitting device. In this way, the first receiving device determined according to an added sequence of the MPDUs in the A-MPDU transmits its own ACK frame when the SIFS elapses after the receiving device completely transmits the A-MPDU, but a next receiving device transmits its own ACK frame when the RIFS elapses after a preceding receiving device transmits its own ACK frame. The SIFS and the RIFS are fixed time intervals defined in WLAN standard. Since the transmitting device should receive the ACK frames when the transmission of the A-MPDU has been completed, the SIFS used to convert reception/transmission cannot be applied between the transmission of the A-MPDU and the reception of the ACK frames. Further, it is unnecessary to convert reception/transmission while receiving the ACK frames from each of the destination devices, and thus the RIFS, the shortest time interval defined in the standard, can be applied.

Since the ACK frames, which are transmitted from the respective destination devices, have the same length defined in the standard, the ACK frames of the destination devices have an equal transmission time. Accordingly, the transmission time of the ACK frame of the destination device can be determined by Equation (1) below.

$$T=\text{SIFS}+(ACK\_Tx\_\text{Time}+\text{RIFS})\times(\text{Order}-1) \quad (1)$$

In Equation (1), 'T' represents the transmission time of the ACK frame counted from the timing when the transmitting device completely transmits the A-MPDU, 'ACK_Tx_time' represents a length of the ACK frame, that is, a time taken to transmit the ACK frame, 'Order' represents an order of the self-destined MPDU in the A-MPDU. For example, in the case of the station (STA1) in FIG. 3, T=SIFS because the order is 1. That is, when the SIFS elapses from the timing when the transmitting device completely transmits the A-MPDU, the station (STA1) can transmit its own ACK frame. In the case of station (STA2), T=SIFS+ACK_Tx_time+RIFS because the order is 2. That is, after the total lapse of the SIFS, one ACK frame transmission time and the RIFS from the timing when the transmitting device completely transmits the A-MPDU, the station (STA2) can transmit its own ACK frame.

In the description for the transmission timing of the ACK frame, when the transmitting device transmits the A-MPDU with the scheduled ACK request (SAR) frame added as illustrated in FIG. 3, it is deemed that the A-MPDU contains the scheduled ACK request (SAR) frame. Thus, it should be understood that the timing when the transmission of the A-MPDU is completed is a timing when the transmission of the scheduled ACK request (SAR) frame is completed.

As described above, the transmitting device may transmit the A-MPDU with the Scheduled ACK (SAR) frame added.

Figure 4:
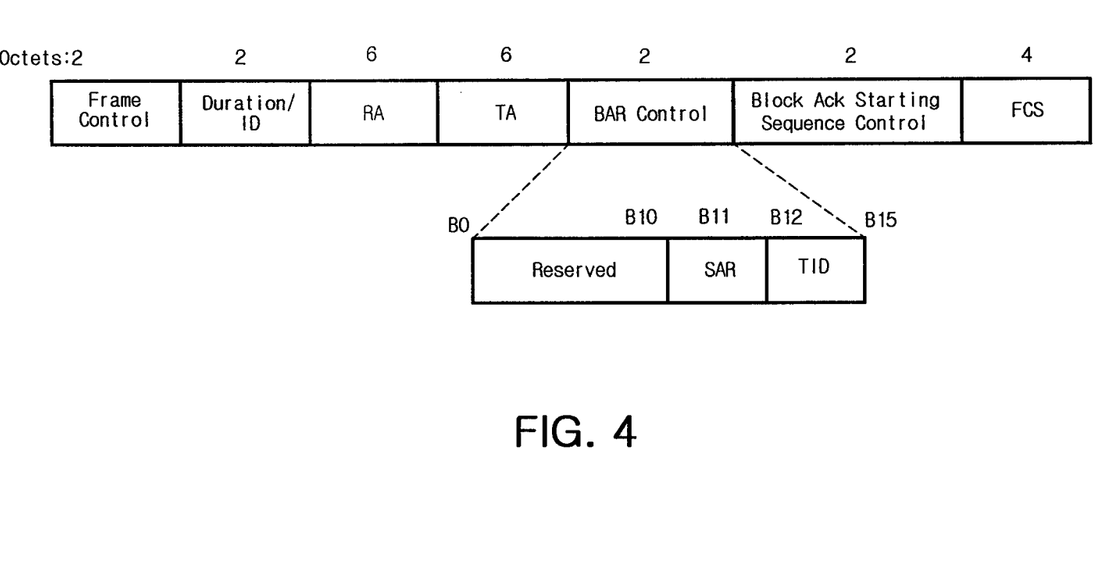
FIG. 4 illustrates an Scheduled Ack request (SAR) frame structure used in the method of transmitting data to multi destinations in a WLAN system according to the embodiment of the present invention.

The Scheduled ACK (SAR) frame is a frame indicating that the transmission of the A-MPDU has been terminated and simultaneously requesting a sequential transmission of ACK frames. In terms of such a sequential request, the ACK request frame used in the present invention may be designated as a scheduled ACK request (SAR). As illustrated in FIG. 4, the ACK request frame may use a block ACK request (BAR) defined WLAN standard (IEEE 802.11n). Especially, the Scheduled ACK (SAR) frame can inform the plurality of destination devices that the ACK frames are sequentially transmitted, through the set-up for one bit of a reserved region in a BAR control field of the BAR frame. For instance, the Scheduled ACK (SAR) frame can be framed such that a value of bit 11 of the BAR control field in FIG. 4 is set to '1'.

Figure 5A:
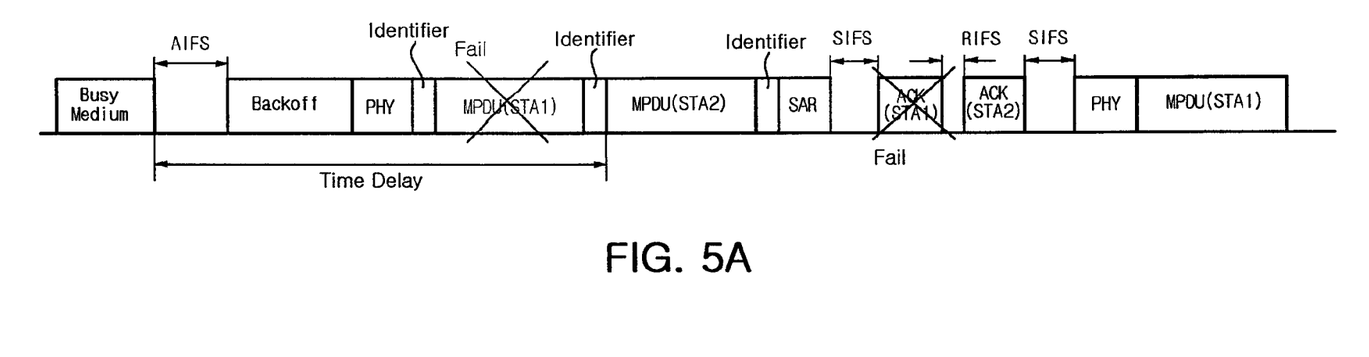
FIGS. 5A and 5B is a frame format comparing the method of transmitting data to multi destinations in a WLAN system according to the embodiment of the present invention with a related art method of transmitting data to multi destinations using a WLAN.
Figure 5B:
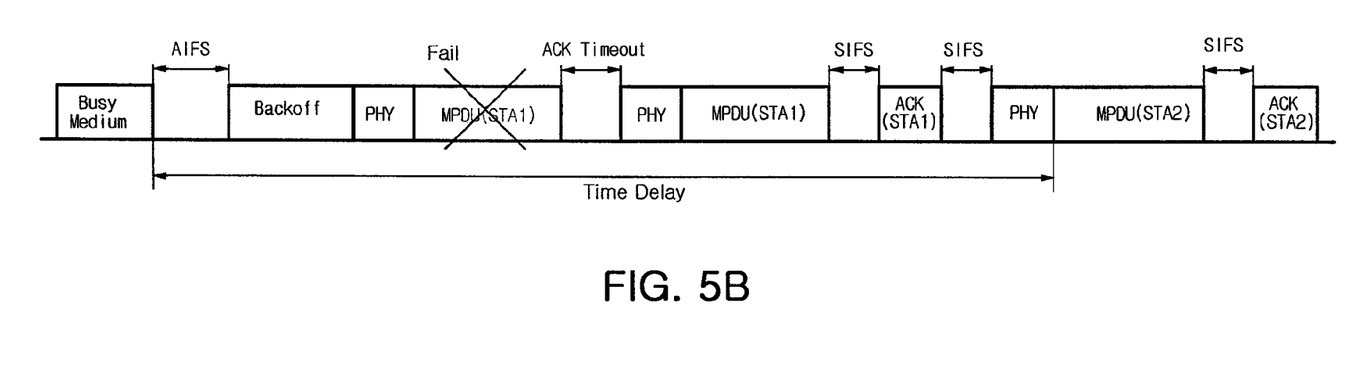

FIG. 5 is a frame format comparing the method of transmitting data to multi destinations in a WLAN system according to the embodiment of the present invention with a related art method of transmitting data to multi destinations using a WLAN.

Referring to FIG. 5(a), in accordance with the method of transmitting data to multi destinations according to the embodiment of the present invention, when the transmitting device does not receive the ACK frame from a specific destination device, that is, when the transmitting device fails to receive the ACK frame from the station (STA1), an operation of sequentially receiving the ACK frames is terminated. After the lapse of the SIFS, the transmitting device adds a physical header to the MPDU for the destination device, e.g., the station (STA1) from which the transmitting device has not received the ACK frame, and then re-transmits the MPDU with the physical header added, to the destination device, e.g., the station (STA1). That is, according to the present invention, since the MPDUs for the multi destinations are aggregated to generate one A-MPDU, it is possible to reduce a time delay in transmitting data to a next receiving device, e.g., the station (STA2), receiving an MPDU even if the transmission of data to the first receiving device (STA1) receiving the first MPDU is failed or erroneous.

FIG. 5(b) illustrates the transmission of MPDUs to two destinations according to the well-known WLAN standard (IEEE 802.11e). According to IEEE 802.11e standard, in order to transmit data, e.g., video data or audio data, requiring good service quality, there is provided an enhanced distributed channel access (EDCA) method of giving the right of using a channel probabilistically depending on priority of data to be transmitted. In the EDCA method, the authority for transmission opportunity (TXOP) is given so that several data can be consecutively transmitted at SIFS intervals while acquiring the TXOP. Referring to FIG. 5(b), in the related art method of transmitting data according to IEEE 802.11e standard, when an arbitration interframe space (AIFS) elapses after a using time of a wireless channel, the transmitting device transmits the MPDU to the first destination device (STA1) after a backoff time. If the transmitting device does not receive the ACK frame from the first destination device even after the lapse of a preset time (ACK Timeout) required for receiving the ACK frame, the transmitting device re-transmits the MPDU to the first destination device (STA1). If the transmitting device receives the ACK frame from the first destination device after the lapse of SIFS from the re-transmission of the MPDU, the transmitting device transmits the MPDU to the second destination device (STA2), and then receives the ACK frame after the lapse of SIFS. In this manner, in the case where data are transmitted to multi destinations using the related art method according to the well-known WLAN standard, the transmission of data to a next destination device must be further delayed if the data is not successfully transmitted to a preceding destination device. In particular, if the preceding destination device fails to receive the data continually, the transmission of MPDU to the next destination device can not be carried out until the re-transmission of the MPDU to the preceding destination device is repeated as many as the preset maximum re-transmission number of times. In this case, therefore, the transmission delay for the next destination device becomes more and more serious.

As illustrated in FIGS. 5(a) and 5(b), according to the inventive transmission method, it is possible to minimize an overall transmission delay of individual destination devices when the data are transmitted to multi destinations in a WLAN system. Particularly, even if one destination device fails to receive data everlastingly, it is possible to carry out the transmission of data to the other destination devices favorably.

According to the present invention, it is possible to minimize an access time to a media in a WLAN system and minimize a transmission delay of data transmitted to multi destination stations. Accordingly, this makes it possible to improve service quality for data composed of image data such as high definition (HD) moving pictures supplied via a WLAN.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of transmitting data to multiple destinations in a wireless local area network (WLAN) system, the method comprising:

generating, by a transmitting device, a media access control protocol data unit (MPDU) for each of a plurality of destination devices;

generating, by the transmitting device, an aggregated-MPDU (A-MPDU) by sequentially adding the MPDU for each of the destination devices;

adding a physical header to the A-MPDU, and transmitting the A-MPDU with the physical header added, to the plurality of destination devices, by the transmitting device;

transmitting, by the respective destination devices, ACK frames, which notify a successful reception, to the transmitting device after receiving a self-destined MPDU from the A-MPDU and verifying the received MPDU; and adding a physical header to an MPDU for a specific destination device, when the transmitting device fails to receive ACK frames from the specific destination device, and transmitting the MPDU with the physical header added, to the specific destination device, after the lapse of a short interframe space (SIFS) from a timing when a sequential transmission of the ACK frames is terminated, wherein the transmitting of the ACK frames to the transmitting device comprises:

detecting, by the respective destination devices, a position and an order of a self-destined MPDU from the A-MPDU; and transmitting, by the respective destination devices, the ACK frames to the transmitting device according to the detected order, and the transmitting of the ACK frames to the transmitting device according to the detected order comprises transmitting the ACK frame to the transmitting device at a timing when a time T determined by the following Equation elapses after the transmission of the A-MPDU is terminated, $$T=\text{SIFS}+(ACK\_Tx\_\text{Time}+\text{RIFS})\times(\text{Order}-1) \quad (1)$$

where ACK_Tx_time is a length of the ACK frame, and Order is the detected order.

2. The method of claim 1, further comprising:
receiving, by the transmitting device, the ACK frames transmitted from the respective destination devices in sequence.

3. The method of claim 2, wherein the generating of the A-MPDU comprises adding an ACK request frame to the A-MPDU, the ACK request frame indicating that the transmission of the A-MPDU is terminated and the sequential transmission of the ACK frames starts.

4. The method of claim 3, wherein:
the ACK request frame uses a block ACK request (BAR) defined in at least one WLAN standard included in IEEE 802.11; and
the ACK request frame informs the plurality of destination devices that the ACK frames are sequentially transmitted, through a set-up for one bit of a reserved region in a BAR control field of a BAR frame.

5. The method of claim 1, wherein the generating of the A-MPDU comprises sequentially adding the MPDUs for the respective destination devices by inserting identifiers between the MPDUs.

6. The method of claim 1, wherein the transmitting of the ACK frames to the transmitting device according to the detected order comprises:
transmitting, by a first destination device according to the detected order, the ACK frame to the transmitting device after the lapse of an SIFS from a timing when the transmission of the A-MPDU is terminated; and
transmitting, by a subsequent destination device according to the detected order, the ACK frame to the transmitting device after the lapse of a reduced interframe space (RIFS) from a timing when the transmission of the ACK frame by a preceding destination device is terminated.

7. A method of transmitting data to multiple destinations in a wireless local area network (WLAN) system, the method comprising:
generating, by a transmitting device, a media access control protocol data unit (MPDU) for each of a plurality of destination devices;
generating, by the transmitting device, an aggregated-MPDU (A-MPDU) by sequentially adding the MPDU for each of the destination devices;
adding a physical header to the A-MPDU, and transmitting the A-MPDU with the physical header added, to the plurality of destination devices, by the transmitting device;
transmitting, by the respective destination device, ACK frames, which notify a successful reception, to the transmitting device after receiving a self-destined MPDU from the A-MPDU and verifying the received MPDU, wherein the transmitting of the ACK frame to the transmitting device comprises
detecting, by the respective destination devices, a position and an order of a self-destined MPDU from the A-MPDU; and
transmitting, by the respective destination devices, the ACK frames to the transmitting device according to the detected order, wherein transmitting device according to the detected order comprises transmitting the ACK frame to the transmitting device at a timing when a time determined by the equation T=SIFS+(AKC_Tx_Time+RIFS)×(Order−1) elapses after the transmission of A-MPDU is terminated, wherein ACK_Tx_time is a length of the ACK frame, and Order is the detected order; and
receiving, by the transmitting device, the ACK frames transmitted from the respective destination devices in sequence.

8. A method of transmitting data to multiple destinations in a wireless local area network (WLAN) system, the method comprising:
generating, by a transmitting device, a media access control protocol data unit (MPDU) for each of a plurality of destination devices;
generating, by the transmitting device, an aggregated-MPDU (A-MPDU) by sequentially adding the MPDU for each of the destination devices;
adding a physical header to the A-MPDU, and transmitting the A-MPDU with the physical header added, to the plurality of destination devices, by the transmitting device;
transmitting, by the respective destination devices, ACK frames, which notify a successful reception, to the transmitting device after receiving a self-destined MPDU from the A-MPDU and verifying the received MPDU;
adding a physical header to an MPDU for a specific destination device, when the transmitting device fails to receive ACK frames from the specific destination device, and transmitting the MPDU with the physical header added, to the specific destination device, after the lapse of a short interframe space (SIFS) from a timing when a sequential transmission of the ACK frames is terminated; and
receiving, by the transmitting device, the ACK frames transmitted from the respective destination devices in sequence, wherein
the transmitting of the ACK frames to the transmitting device comprises:
detecting, by the respective destination devices, a position and an order of a self-destined MPDU from the A-MPDU; and
transmitting, by the respective destination devices, the ACK frames to the transmitting device according to the detected order, and
the transmitting of the ACK frames to the transmitting device according to the detected order comprises transmitting the ACK frame to the transmitting device at a timing when a time T determined by the following Equation elapses after the transmission of the A-MPDU is terminated, $$T=\text{SIFS}+(ACK\_Tx\_\text{Time}+\text{RIFS})\times(\text{Order}-1) \quad (1)$$

where ACK_Tx_time is a length of the ACK frame, and Order is the detected order.

* * * * *